US012358772B2

(12) United States Patent
Testoni et al.

(10) Patent No.: US 12,358,772 B2
(45) Date of Patent: Jul. 15, 2025

(54) APPARATUS AND PROCESS FOR DISPENSING A LIQUID PRODUCT INTO CONTAINERS

(71) Applicant: G.D S.p.A., Bologna (IT)

(72) Inventors: Luca Testoni, Bologna (IT); Daniele Grosso, Bologna (IT); Manuele Cucchi, Bologna (IT); Stefano Serafini, Bologna (IT)

(73) Assignee: G.D S.p.A., Bologna (IT)

( * ) Notice: Subject to any disclaimer, the term of this patent is extended or adjusted under 35 U.S.C. 154(b) by 44 days.

(21) Appl. No.: 18/345,260

(22) Filed: Jun. 30, 2023

(65) Prior Publication Data

US 2024/0002206 A1 Jan. 4, 2024

(30) Foreign Application Priority Data

Jul. 4, 2022 (IT) ........................ 102022000014119

(51) Int. Cl.

*B67C 3/28* (2006.01)
*B67C 3/00* (2006.01)
*B67C 3/24* (2006.01)
*B67C 3/26* (2006.01)

(52) U.S. Cl.

CPC ................ *B67C 3/28* (2013.01); *B67C 3/007* (2013.01); *B67C 3/24* (2013.01); *B67C 3/2608* (2013.01)

(58) Field of Classification Search

CPC ........... B67C 3/24; B67C 3/2608; B67C 3/28; B67C 3/007

See application file for complete search history.

(56) References Cited

U.S. PATENT DOCUMENTS

| | | | | |
|---|---|---|---|---|
| 3,065,775 | A * | 11/1962 | Keves | B65B 39/001 222/533 |
| 7,628,184 | B2 * | 12/2009 | Py | A61L 2/10 141/237 |
| 8,590,581 | B2 | 11/2013 | Clüsserath | |

FOREIGN PATENT DOCUMENTS

| | | | |
|---|---|---|---|
| CN | 110467140 | A | 11/2019 |
| CN | 110482460 | A | 11/2019 |

OTHER PUBLICATIONS

Search Report dated Mar. 2, 2023. 7 pages.

* cited by examiner

*Primary Examiner* — Timothy L Maust
(74) *Attorney, Agent, or Firm* — RMCK Law Group PLC

(57) ABSTRACT

An apparatus for dispensing a liquid product into containers includes a conveyor for conveying a plurality of containers through a filling station; a dispensing unit set in the filling station and including one or more nozzles and a system for pumping the liquid product to said one or more nozzles for dispensing the liquid product into the containers that follow one another in the filling station; a tank including a collection chamber and at least one inlet mouth in communication with the collection chamber, the tank being mobile between a resting position and a working position in which the at least one inlet mouth is set in a position underlying the one or more nozzles; and a control unit configured for controlling movement of the tank from the resting position (P1) to the working position, and vice versa.

11 Claims, 2 Drawing Sheets

APPARATUS AND PROCESS FOR DISPENSING A LIQUID PRODUCT INTO CONTAINERS

CROSS-REFERENCE TO RELATED APPLICATION

This application claims priority to Italian Patent Application No. 102022000014119 filed Jul. 4, 2022. The disclosure of the above application is incorporated herein by reference in its entirety.

FIELD

The present invention relates to an apparatus for dispensing a liquid product into containers and a corresponding process.

In particular, the above apparatus and the corresponding process find particular application in the sector of electronic cigarettes, in which cartridges are to be filled with a liquid product. Alternatively, the above apparatus finds application in the pharmaceutical sector, in which containers of various shapes and/or sizes are to be filled with a liquid product.

BACKGROUND

An apparatus of a known type for dispensing a liquid product into containers comprises:

- a conveyor for conveying a plurality of containers through a filling station;
- a dispensing unit set in the filling station and comprising one or more nozzles for dispensing the liquid product into containers that follow one another in the filling station; and
- a system for pumping a liquid product to said one or more nozzles.

A problem that afflicts apparatuses of the type referred to above regards possible dripping of the liquid product from the nozzles of the dispensing unit between one dispensing cycle and the next, in particular during unexpected interruptions of operation of the apparatus.

The liquid product that drips from the nozzles then in fact soils the contiguous components and devices of the apparatus, for example the conveyor for conveying the containers, and may hence cause malfunctioning or jamming of the apparatus. Moreover, this calls for frequent interventions of cleaning of the apparatus. On the other hand, the liquid product lost owing to dripping is wasted and cannot be recovered.

Object and Summary

In this context, the present invention proposes an apparatus that is able to overcome the aforesaid drawback.

The above object is achieved via an apparatus for dispensing a liquid product into containers according to claim 1.

The present invention moreover relates to a process for dispensing a liquid product into containers according to claim 10.

The claims form an integral part of the disclosure and teaching provided herein.

BRIEF DESCRIPTION OF THE DRAWINGS

Further characteristics and advantages of the present invention will emerge clearly from the ensuing description with reference to the annexed drawings, which are provided purely by way of non-limiting example and in which.

DESCRIPTION

In the ensuing description various specific details are illustrated, aimed at enabling an in-depth understanding of the embodiments. The embodiments may be provided without one or more of the specific details, or with other methods, components, or materials, etc. In other cases, known structures, materials, or operations are not illustrated or described in detail so that various aspects of the embodiment will not be obscured.

The references used herein are provided merely for convenience and hence do not define the sphere of protection or the scope of the embodiments.

As anticipated above, the apparatus described herein and forming the subject of the present invention is configured for dispensing a liquid product into containers.

An example of application of the apparatus described herein regards filling of cartridges for electronic cigarettes. Other possible examples of application regard filling of flasks or vials or similar containers in the pharmaceutical, cosmetics, or foodstuff sectors.

Figure 1:
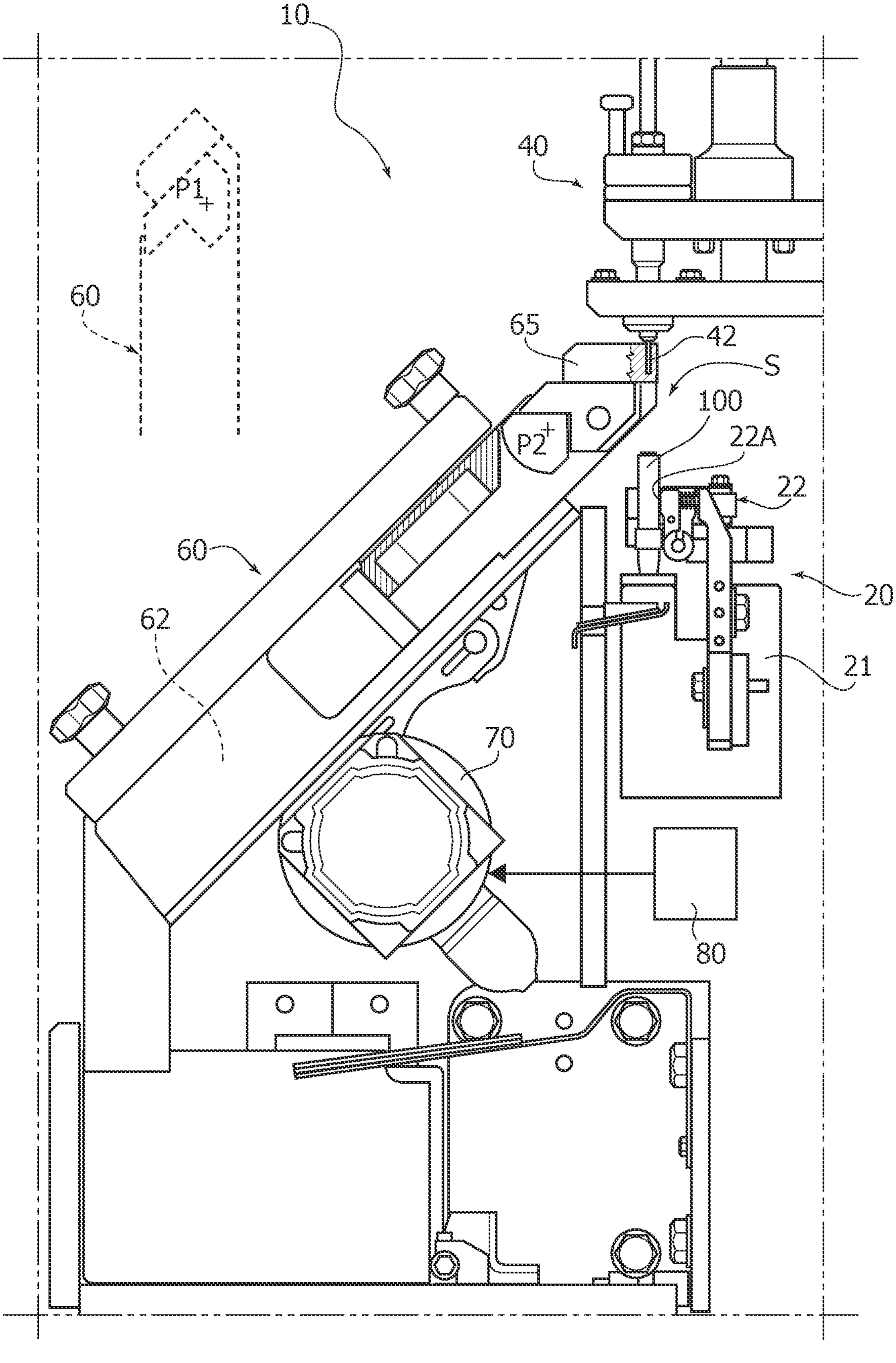
FIG. 1 illustrates an example of the apparatus forming the subject of the present invention.

With reference to FIG. 1, the apparatus, designated as a whole by the reference number 10, comprises a conveyor 20, which receives containers 100 to be filled in a loading station (not illustrated), supplies the containers 100 to a filling station S, and finally conveys the filled containers 100 to a further processing station (not illustrated—for example a station for closing the containers) or else a station for unloading the containers (not illustrated).

In one or more preferred embodiments, like the one illustrated, the conveyor 20 comprises a guide 21 that extends along a closed ring-shaped path and a series of moving elements 22 that are mobile on the guide 21. The moving elements 22 are each provided with one or more seats 22A for housing a container 100 within each seat 22A. Preferably, the moving elements 22 are motor-driven in an independent way so as to move on the guide 21 independently of one another.

Alternatively, the conveyor 20 could be a belt conveyor with trays for housing the containers 100 or else a conveyor belt.

The apparatus 10 comprises a dispensing unit 40 set in the filling station S. The dispensing unit 40 comprises one or more nozzles 42 (for example, in a number ranging from 1 to 10) for dispensing the liquid product into a corresponding number of containers 100 that are located in the filling station S.

In one or more preferred embodiments, like the one illustrated, the nozzles 42 are constituted by dispensing needles configure to be inserted into the containers 100 for dispensing the liquid product.

Figure 2:
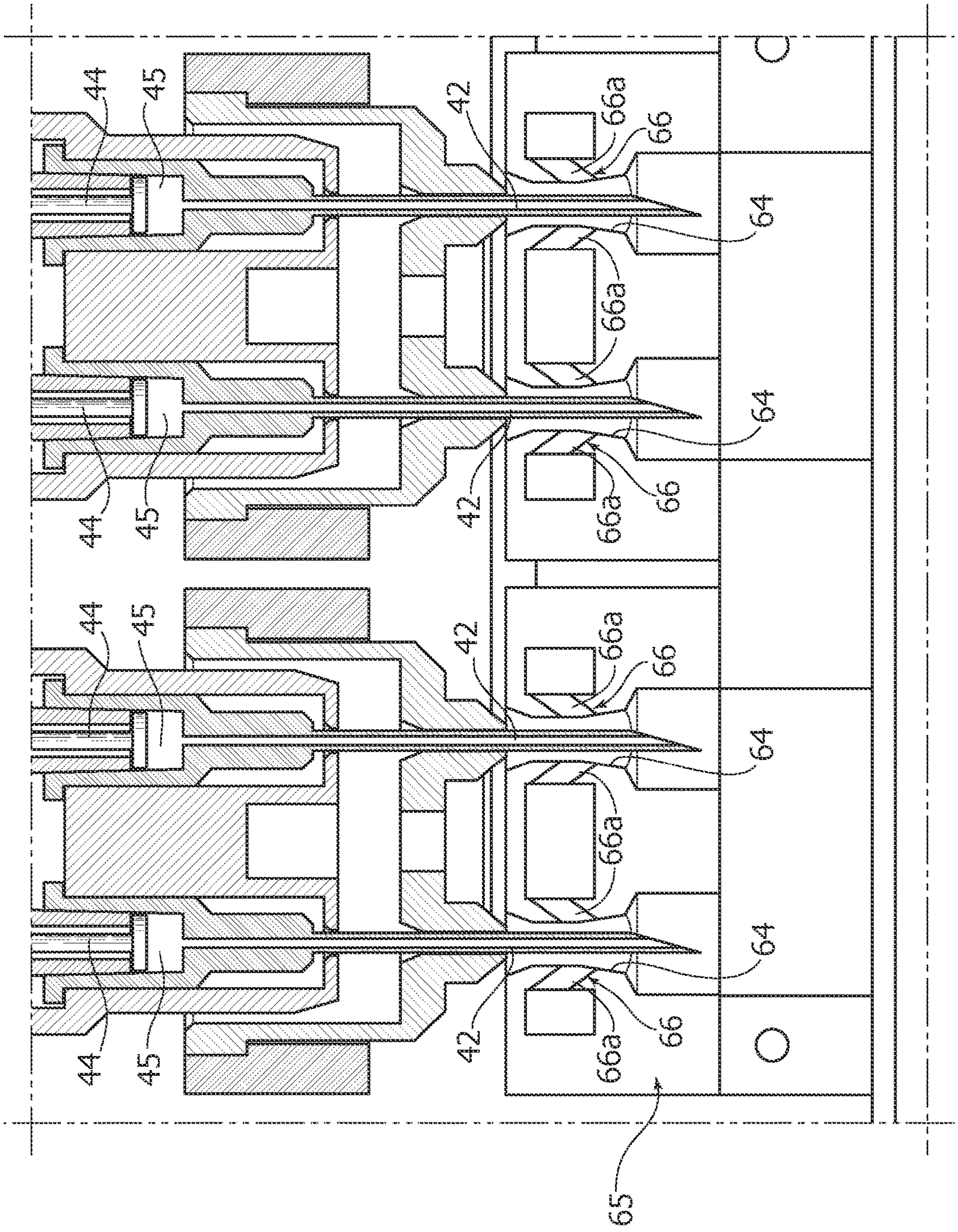
FIG. 2 is a cross-sectional view of a detail of the apparatus of FIG. 1.

The dispensing unit 40 comprises a system for pumping the liquid product to the nozzles 42. With reference to FIG. 2, the aforesaid pumping system may comprise plunger members 44 that are mobile with reciprocating motion within respective chambers 45 for sucking into the chambers 45 themselves the liquid product from a corresponding reservoir and expelling the liquid product out of the chambers 45 and through the nozzles 42.

The dispensing unit 40 is of a known type, and consequently further details will not be provided herein so as not to overburden the present treatment.

Preferably, the dispensing unit 40 is vertically mobile to bring the nozzles 42 into the containers 100 to be filled. For instance, the dispensing unit 40 is carried by a slide that slides on a vertical guide.

Alternatively, the nozzles 42 may be configure to perform a vertical movement that is independent of that of the other parts of the dispensing unit 40.

In general, preferably, the one or more nozzles 42 are mobile between a raised, inoperative, position (not illustrated) and a lowered position (illustrated in the figures) for dispensing the liquid product.

According to an important characteristic of the solution described herein, the apparatus 10 comprises a tank 60, which is provided with a collection chamber 62 and with one or more inlet mouths 64 in (fluid) communication with the collection chamber 62.

In particular, the number of inlet mouths 64 of the tank 60 is at least equal (preferably equal) to the number of nozzles 42 of the dispensing unit 40.

In one or more preferred embodiments, like the one illustrated, the inlet mouths 64 are vertical ducts provided in one or more blocks 65 that close the top open end of the tank 60.

The tank 60 is mobile between a resting position P1 and a working position P2, in which the inlet mouths 64 are arranged in a position underlying the nozzles 42; the tank 60 in the resting position P1 is represented schematically in FIG. 1 with a dashed line.

When the tank 60 is in the working position P2, the nozzles 42 are lowered into their operating position, moving into the inlet mouths 64.

In one or more preferred embodiments, like the one illustrated, the apparatus 10 comprises a control unit 80 configured for controlling movement of the tank 60 from the resting position P1 to the working position P2, and vice versa.

In particular, the control unit 80 governs movement of the tank 60 from the resting position P1 to the working position P2 as a function of a signal indicating a condition of stop of the dispensing unit 40.

The control unit 80 itself, or a further control unit, is configured for controlling, subsequently, movement of the nozzles 62 into their lowered operating position, for example as a function of a signal that confirms positioning of the tank 60 in the working position P2.

According to a preferred embodiment, the tank 60 is mobile between the resting position and the working position according to a movement of translation that is preferably driven via an actuator governed by the control unit 80.

According to other embodiments, the tank 60 is mobile between the resting position and the working position according to a movement of rototranslation that is driven via a rotary actuator 70, governed by the control unit 80.

In operating conditions, when the apparatus 10 interrupts its operation, some liquid product may remain inside the one or more nozzles 42, and/or the nozzles 42 could have already taken in the liquid product for what should have been the new dispensing cycle. Consequently, the tank 60 is moved automatically into the working position P2, the nozzles 42 come to occupy their operating position (i.e., within the inlet mouths 64 of the tank 60), and a cycle is started for dispensing the liquid product into the tank 60 (the so-called cycle of draining of the nozzles 42). Advantageously, any undesired dripping of the liquid product into the working environment is thus prevented.

In one or more preferred embodiments, like the one illustrated, the tank 60 is provided with a system for blowing air comprising one or more outlets 66 for dispensing a blow of air against said one or more nozzles 42 received within the inlet mouths 64 of the tank 60.

In other words, the aforesaid one or more outlets 66 give out into the inlet mouths 64 of the tank 60 so as to direct a blow of air against the nozzles 42 received within the inlet mouths 64 themselves. In particular, the blow of air is directed by the outlets 66 against the outer surface of the nozzles 42. Advantageously, any possible liquid product that might have remained stuck to the outer surface of the nozzles 42 is removed from the nozzle and pushed into the collection chamber 62 of the tank 60.

Preferably, the outlets 66 are connected through a set of ducts to a common source of air under pressure (not illustrated).

In particular, with reference to FIG. 2, each inlet mouth 64 is defined by a vertical duct.

According to the preferred embodiment illustrated in FIG. 2, the blowing system envisages for each inlet mouth 64 a pair of holes 66*a* that give out into said vertical duct to define said outlets 66 for dispensing a blow of air.

Preferably, said holes 66*a* extend towards said vertical duct in a direction inclined downwards with respect to the vertical axis of said vertical duct.

Preferably, the outlets 66 are provided in a top region of the inlet mouth 64 so that the blow of air delivered by them will strike at least half of the length of the nozzle 42 inserted into a said inlet mouth 64.

As has been said, the aforesaid blow of air has the function of removing from the outer surface of the one or more nozzles any possible drops of liquid product that have stuck to the surface itself, draining them once again off into the tank 60.

It remains understood that the number and position of the outlets 66 and/or the holes 66*a* for each inlet mouth 64 can vary with respect to what is illustrated in FIG. 2. In particular, the number of outlets 66 and/or holes 66*a* for each inlet mouth 64 may be comprised between one and six.

At the moment when operation of the apparatus 10 resumes to fill further containers 100, the tank 60 is once again moved into the resting position P1, and the dispensing unit 40 is immediately ready to start a new cycle of dispensing of the liquid product.

The collection chamber 62 of the tank 60 may be connected to a supply line that is to feed the liquid product to a reservoir or directly to the dispensing unit 40 so as to be able to recover the liquid product collected in the tank 60 and use it in new dispensing cycles.

Alternatively, the collection chamber 62 may be manually extractable so that an operator can take out the collection chamber 62 (for example, when it is in the resting position P1) and recover the liquid product contained therein.

Of course, without prejudice to the principle of the invention, the details of construction and the embodiments may vary, even significantly, with respect to what has been illustrated purely by way of non-limiting example herein, without thereby departing from the scope of the invention, as defined by the annexed claims.

The invention claimed is:

1. An apparatus for dispensing a liquid product into containers, comprising:

a conveyor for conveying a plurality of containers through a filling station;

a dispensing unit set in the filling station and comprising one or more nozzles for dispensing the liquid product into containers of the plurality of containers that follow one another in the filling station and a system for pumping the liquid product to said one or more nozzles;

a tank comprising a collection chamber and at least one inlet mouth in communication with the collection chamber, said tank being mobile between a resting position and a working position in which said at least one inlet mouth is set in a position underlying said one or more nozzles; and a control unit configured for controlling movement of said tank from the resting position to the working position and vice versa as a function of a signal indicating a condition of stop of the dispensing unit.

2. The apparatus according to claim 1, wherein said control unit is configured for controlling said pumping system when said tank is in said working position so that said one or more nozzles can expel the liquid product into said tank.

3. The apparatus according to claim 1, wherein, when the tank is in the working position, said one or more nozzles are arranged within the at least one inlet mouth of the tank and wherein said tank is provided with a system for blowing air, which comprises one or more outlets for dispensing a blow of air against said one or more nozzles received within said at least one inlet mouth.

4. The apparatus according to claim 1, wherein said at least one inlet mouth comprises a plurality of inlet mouths for receiving, each, a respective nozzle of the one or more nozzles of said dispensing unit.

5. The apparatus according to claim 3, wherein each inlet mouth is defined by a vertical duct, and wherein a pair of holes of said system for blowing air give out into said vertical duct to define said one or more outlets for dispensing said blow of air.

6. The apparatus according to claim 5, wherein said pair of holes extends toward said vertical duct in a direction inclined downwards with respect to a vertical axis of said vertical duct.

7. The apparatus according to claim 1, comprising an actuator for driving movement of said tank between the resting position and the working position.

8. The apparatus according to claim 1, wherein said dispensing unit or said one or more nozzles is/are configured to move vertically for inserting said one or more nozzles into said at least one inlet mouth of the tank when the tank is located in said working position.

9. The apparatus according to claim 1, wherein the tank is mobile between the resting position and the working position according to a movement of translation.

10. A process for dispensing a liquid product into containers, comprising:

conveying a plurality of containers through a filling station;

by means of one or more nozzles of a dispensing unit that is set in the filling station, dispensing a liquid product into containers of the plurality of containers that follow one another in the filling station;

providing a tank comprising a collection chamber and at least one inlet mouth in communication with the collection chamber;

moving said tank from a resting position to a working position in which the at least one inlet mouth is set in a position underlying said one or more nozzles during a stop of the dispensing unit; and when the tank is in the working position, dispensing the liquid product contained in said one or more nozzles and/or dispensing a blow of air against said one or more nozzles.

11. The process according to claim 10, wherein the tank is moved between the resting position and the working position according to a movement of translation.

* * * * *